United States Patent

Summers, Jr.

[15] 3,667,032
[45] May 30, 1972

[54] METAL IDENTIFICATION METER EMPLOYING THE THERMOELECTRIC EFFECT

[72] Inventor: James E. Summers, Jr., 117 Columbia Drive, Oak Ridge, Tenn. 37830

[22] Filed: Oct. 7, 1969

[21] Appl. No.: 864,363

[52] U.S. Cl. ................................................. 324/32
[51] Int. Cl. ........................................... G01r 5/22, 324 32
[58] Field of Search ................................................. 219/227

[56] References Cited
UNITED STATES PATENTS 2,488,477  11/1949  Rapaport ............................... 219/227
2,924,771  2/1960  Greenberg et al. ....................... 324/32
2,972,882  2/1961  Erwin .................................... 324/32

*Primary Examiner*—Gerard R. Stricker
*Attorney*—Anderson, Luedeka, Fitch, Even & Tabin

[57] ABSTRACT

A metal comparator employing the thermoelectric effect of dissimilar metals joined in a circuit with a voltage indicator and employing two probes of identical metallic composition, one of the probes being heated to a temperature greater than ambient temperature.

4 Claims, 3 Drawing Figures

**110 VOLT
60 CYCLE**

PATENTED MAY 30 1972 3,667,032

INVENTOR.
James E. Summers, Jr.
BY Anderson, Luedeka,
Fitch, Even & Tabin
ATTORNEY.

METAL IDENTIFICATION METER EMPLOYING THE THERMOELECTRIC EFFECT

This invention relates generally to metal identification devices and more specifically to metal identification meters utilizing the thermoelectric effect of dissimilar metals joined in an electrical circuit.

Sorting of metal stock is a significant problem with metal suppliers having large inventories, in that many dissimilar metals look alike to the eye. Metal identification may also be important in certain industrial situations, such as in a chemical processing plant where it is desired to know the general nature of the metallic pipelines or to at least assure that the metallic composition of a pipeline is not incompatible with a potentially corrosive chemical which is to be introduced into the pipeline. These and many other similar situations represent the need for a portable device capable of reliably indicating the composition of an unknown metal.

In accordance with thermoelectric theory, specifically the Seebeck effect, when two dissimilar metals are joined in an electrical circuit and the junctions between the two metals are at different temperatures, an electromotive force (emf) will be observed in the circuit. In general, the emf is a function of the temperature difference between the junctions and of the nature of the materials comprising the circuit.

Inasmuch as the emf developed in a circuit as described above is a function of the temperature difference between the junctions, in order to make use of the emf for purposes of identifying dissimilar metals it has heretofore been necessary to know either the difference in the junction temperatures or the temperature of the two junctions between the dissimilar metals so that the temperature difference at the time the identification is made can be calculated. Moreover, in the prior art devices, fluctuations in ambient temperature causing changes in junction temperatures obviously were disruptive and created false identifications.

It is therefore an object of the present invention to provide a portable metal identification device capable of reliably indicating the composition of an unknown metal and which functions independently of the ambient temperature prevailing at the time of the identification.

In accordance with the present invention, it has been discovered that a thermoelectric effect can be employed in metal identifications without regard for the ambient temperature or temperature changes which may occur in the course of an identification. This result is achieved by joining the unknown metal in a circuit with a voltage indicator, such as a millivoltmeter, through the use of two probes of identical metallic composition, adjacent one of which there is disposed a heater having continuously supplied thereto a constant quantity of electrical power so as to maintain such probe at a constant elevated temperature. It has been found that this arrangement results in an emf at the cooler probe representative of the probe-to-metal specimen junction at the existing temperature, this emf subtractively combining in the circuit with the higher emf developed at the heated junction to produce a net emf from which there has been eliminated the undesired temperature effect, That is, the cooler probe, being of identical metallic composition as the heated probe acts as a temperature compensator as will appear more fully hereinafter.

In the usual circumstances of use of the present invention, the metal identification is not necessarily of an exacting nature, e.g., the identification is primarily intended for differentiating between metals for making preliminary identification in the field, and not for analyzing the specific percentage of alloying elements of a metallic composition. Consequently, the emfs associated with the present invention, in the usual instance, will not be so nearly equal as to be affected by the differing rates of thermal radiation exhibited by the individual probes of the present meter. In the following discussion, therefore, the effect of differing radiation rates between two separated metallic probes, one of which is heated to a temperature higher than the temperature of the other, is ignored. Should this differing rate of thermal radiation become significant, such could be cured through the use of an appropriate thermostat connected in the electrical circuit so as to compensate for the differing radiation rates.

Figure 1:
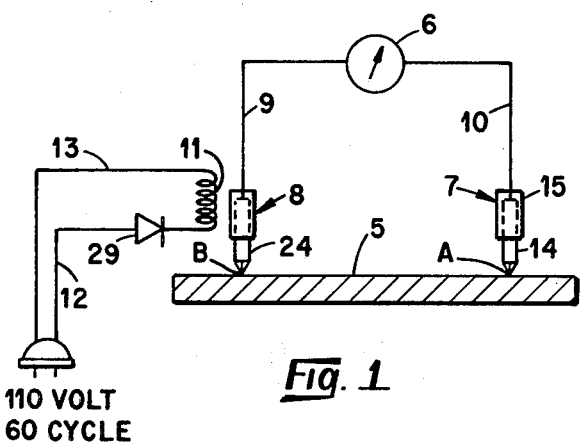
FIG. 1 is a representation of one embodiment of the present invention depicting two probes contacting the metal under examination and connecting it in circuit with a millivoltmeter.

Referring now to the FIGURES, in FIG. 1 there is shown a preferred embodiment of the present invention comprising a specimen 5 of unknown metallic composition contacted at separated points A and B by probes 7 and 8 thereby joining the metal specimen in an electrical circuit with a millivoltmeter 6 through leads 9 and 10. A resistance heating element 11 is disposed contiguously to probe 8 for the purpose of heating the same to a constant temperature. Electrical power is applied to heating element 11 through leads 12, 13 connected to a source of electrical energy, e.g., a conventional 110 volt, 60 cycle, source of alternating current. When using alternating current, preferably a diode rectifier 29 is provided in one of the leads to convert the alternating current to direct current. It is equally effective, however, to utilize a source of direct current in lieu of the alternating current, in which case there would be no need for a rectifier.

Probe 7, referred to as the cool probe for purposes of this disclosure preferably comprises a contact element 14 electrically connected with lead 10, hence with one terminal of millivoltmeter 6, through a low resistance terminal as by soldering or the like. Contact element 14 is relatively massive and preferably pointed at its tip so as to effect good electrical contact and establish the required electrical junction with the metal specimen. It is important in this invention that the contact element be pointed at that end thereof which contacts the metal specimen so that there will be only minimal thermal transfer between the contact and the metal specimen thereby minimizing any effect of temperature changes upon the emf subsequently developed at the junction as will be further discussed hereinafter. An insulative sleeve 15 is provided around contact 14 to electrically and thermally insulate the contact from the hand of a user as he grasps the probe during the course of a metal identification. Copper metal has been found particularly acceptable for use in constructing contact element 14 for reasons which will appear hereinafter.

Figure 2:
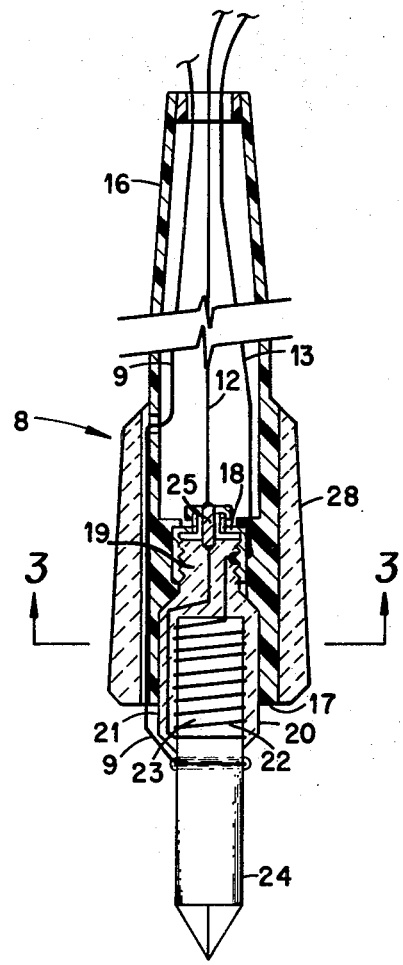
FIG. 2 is a detailed representation, in section, of a preferred embodiment of the heated probe employed in the present invention.
Figure 3:
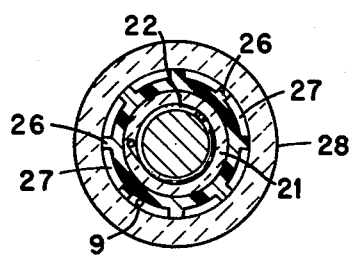
FIG. 3 is a sectional view taken along the line 3—3 of FIG. 2.

The construction of the heated probe is of particular significance in the present invention. As shown in detail in FIG. 2, probe 8 comprises a tubular housing 16 dimensioned to be readily and comfortably grasped in the hand of the user. One end 17 of the housing is recessed to fixedly receive an internally threaded metal socket therein. Socket 18 receives, in threaded engagement, the externally threaded end 19 of a resistance heater 20 comprising an insulative body 21 having embedded therein a heating element 22 and an end portion 23 of a contact element 24. One end of heating element 22 is electrically joined, as by soldering, to a contact 25 which extends from body 21 to connect one end of the heating element to one lead 12 from the aforedescribed power supply. The other end of the heating element is joined through the metal insert 18 to the other lead 13 from the power supply. The heating element encircles end 23 of probe tip 24 such that heat is readily transferred to the probe tip to increase its temperature as desired, such heat being conducted along the length of the probe to heat the entire tip uniformly.

The present identification meter has been found to operate efficiently when probe 8 is heated to an elevated temperature of at least about 325° F. In the usual circumstances of use, heated probe temperatures of less than about 325° F. produces emfs which are undesirably small for practical use. Temperatures greater than 325° F. make the heated probe too hot for the operator to handle and create thermal-insulation problems.

It is desired that the probe be readily held in the hand of a user so as to enhance the versatility and portability of the device and insure that a good junction is established between the tip and the metal specimen. Accordingly, it has been found necessary to provide adequate thermal insulation between the probe and the user's hand without deleteriously reducing the ease with which the probe may be grasped, since considerable hand fatigue can result after prolonged holding of the tip in good pressure contact with the metal specimens when making multiple identifications. The desired result has been found best achieved by providing a plurality of exterior radial fins 26 on housing 16 extending longitudinally from end 17 a substantial distance, and fitting a thermally-insulative, thin-walled sleeve 28 over the fins in circumscribing relation to define a plurality of air-flow cooling channels 27 between housing 16 and sleeve 28. Natural circulation of air through these channels has been found effective to conduct away sufficient heat to permit extended usage of the probe without burning the user's hand, and assist in maintaining the heated probe at a constant elevated temperature.

Electrical connection between probe tip 24 and the millivoltmeter is by means of lead 9. Due to the high temperature of tip 24 during operation of the device, lead 9 is susceptible to thermal degradation of its electrical insulation in the region where the lead joins the tip. In accordance with the present invention, lead 9 is stripped of all insulation in such danger region, electrically connected to the tip 24 (as by soldering), and fed through one of the channels 27, thence into the tubular housing 16 through an opening spaced out of the region of most elevated temperature but still within the length of the channel. Thus, the channel performs the further function of electrically isolating the lead 9 as it passes from tip 24 into housing 16, thereby permitting the wire to be without electrical insulation thereon in the danger region, yet precluding contact therewith by the user's hand or other objects which might create a short circuit and a false identification.

In use, probes 7 and 8 are grasped in the hands of a user and tips 14 and 24 are pressed into contact with a specimen of the unknown metal at separated points. Preferably these points are spaced apart by a distance sufficient to negate any thermal transfer between the points as a consequence of the proximity of the heated probe. A distance of about 1 or 2 inches has been found sufficient for this purpose where contact with the metal specimen is maintained for not more than a few seconds.

It is important in the present invention that probe tips 14 and 24 be of substantially identical metallic composition. During the period of contact, the tip 14 of the cool probe established a first junction between the copper tip and the unknown metal. Because the area of contact is small and the tip is pointed, the junction assumes the temperature of the metal specimen and the emf developed is that which is characteristic of the copper-to-unknown-metal junction at such temperature, that is, the temperature of the unknown metal. Also during the period of contact, because of the pointed geometry of tip 24, there is transferred from the heated tip to the metal specimen a minute quantity of heat sufficient only to heat the surface layer of metal to the probe temperature of 325° F. and thereby establish a copper-to-unknown-metal junction at the elevated temperature. The emf developed at this hot junction is that which is characteristic for the copper-to-unknown-metal junction at the elevated temperature of the probe, i.e., 325° F. for example, and is independent of the temperature of the metal specimen per se. It is noted that the electrical polarity of the cool and heated junctions are opposite, therefore, in the circuit the cool probe emf (representative of the unknown metal temperature) is subtractively combined with the hot probe emf to produce a net emf from which there has been subtracted the emf representative of the temperature of the unknown metal. Therefore, the emf displayed by the millivoltmeter is representative of the copper-to-unknown-metal junction emf at the elevated temperature, for example 325° F.

Conventional thermoelectric theory indicates that any change in the temperature of the table — metal during the course of an identification would result in a change in the temperature difference between the two junctions and an accompanying change in the net emf in the circuit. For reasons presently unknown, it has been found that so long as the temperature of the unknown metal remains below the hot probe temperature (325° F. for example) the present device displays a net emf output which remains constant for a given metal irrespective of the temperature of the unknown metal at the time it is examined. Accordingly, it is possible with the present invention to establish a table of emfs representative of respective metals or metallic compositions and thereafter make identifications by comparing emf readings taken from the millivoltmeter with the emfs of the table—all without regard for the temperature of the unknown metal. This desirable effect of temperature independence has not been found obtainable unless the two probe tips are of common metallic composition.

Preferably, the probe tips 14 and 24 are constructed of copper metal for the reason that copper, in a thermoelectric junction with most common metals, develops a sizable emf. Also, copper develops approximately equal "positive" and "-negative" emfs with most metals. That is, such emfs are about equally divided as to "positive" and "negative" polarities and as to their magnitudes.

Typical emfs experimentally determined for several metals and metallic compositions employing a device constructed in accordance with the present invention are set forth in the following table. The emf values were obtained using a hot probe temperature of 325° F.

| Metal or Metallic Composition | EMF (millivolts) |
|---|---|
| Monel | +88 |
| Nickel | +39 |
| Inconel | −12.5 |
| Hastalloy | + 2 |
| Tungsten | − 5 |
| 347 Stainless Steel | + 8.5 |

Typically, an operator of the present metal identification meter connects the meter to an appropriate source of electrical energy so as to heat probe 8 to the desired constant temperature. Thereupon the cool probe and heated probe will be placed in contact with the unknown metallic composition and the developed emf caused to appear on millivoltmeter 6. From this reading and a knowledge of the emf characteristic for different metallic compositions, the operator can identify the unknown metallic composition.

Whereas copper metal has been indicated as preferable in the fabrication of probe tips 14, 24, it is recognized that other materials may be employed so long as the metallic compositions of the two probe tips remain identical. Moreover, whereas various features of the present invention have been described herein with reference to specific materials or elements it will be recognized that equivalent materials and elements could be substituted without departure from the scope of the present invention.

What is claimed is:

1. In an identification meter for identifying metallic objects and including in an electrical circuit a voltage indicator having two separate electrically conductive probes adapted to contact a metallic specimen and join it in said electrical circuit, one of said probes being heated to a temperature higher than the temperature of said metallic specimen and the other of said probes, the improvement wherein said two probes are of identical metallic composition and each junction between a probe and the metallic specimen generates an individual electromotive force characteristic for such junction at its existing temperature, said individual electromotive forces being identical in polarity hence productive of a net electromotive force in the circuit representative of the subtractively combined individual electromotive forces and indicative of the metallic composition of said specimen, said probes having pointed tips for contacting said specimen whereby the area of contact between each of said probes and said specimen is sufficiently small as will result in minimal thermal transfer between said probes and said specimen.

2. An identification meter for metallic objects under conditions of varying ambient temperature and comprising in combination, a voltage indicator including two separate electrical leads extending therefrom, a probe electrically joined to the unattached end of each of said electrical leads, each probe comprising respective contact elements electrically joined with respective ones of said electrical leads and having pointed tips adapted to join the metallic object under study in an electrical circuit with said voltage indicator, one of said probes including a resistance heating element disposed in intimate heat-communicating relationship with the contact of said probe, means supplying electrical power to said resistance heating element to create a predetermined constant heat in the same and resultant heating of said contiguous contact of said probe to a constant temperature higher than the temperature of the metallic object under study and the other of said probes, wherein said probes are of identical metallic composition and each junction between a probe and the metallic object under study generates an individual electromotive force characteristic for such junction at its existing temperature, said individual electromotive forces being identical in polarity hence productive of a net electromotive force in the circuit representative of the subtractively combined individual electromotive forces and indicative of the composition of said metallic object and the area of contact between each of said contact element of each of said probes and said specimen being sufficiently small as will result in minimal thermal transfer between each of said contact elements and said specimen.

3. The invention of claim 2 wherein said voltage indicator comprises a millivoltmeter and said net emf is visually displayed by said millivoltmeter.

4. The invention of claim 2 wherein the probe disposed contiguously to said resistance heating element comprises a tubular housing adapted to receive in one of its open ends said resistance heating element and at least a substantial part of said contact element, and including a plurality of radial fins extending longitudinally along the outermost surface of said housing a substantial distance from that end thereof encompassing said heating and contact elements, and a thermally and electrically insulative sleeve circumscribing and contacting said fins to define a plurality of open conduits between said sleeve and said housing.

* * * * *

UNITED STATES PATENT OFFICE
CERTIFICATE OF CORRECTION

Patent No. 3,667,032           Dated  May 30, 1972

Inventor(s) James E. Summers, Jr.

It is certified that error appears in the above-identified patent and that said Letters Patent are hereby corrected as shown below:

Column 4, line 2, after "the" (second occurrence), omit "table _" and insert -- unknown --

Signed and sealed this 19th day of December 1972.

(SEAL)
Attest:

EDWARD M. FLETCHER, JR.                ROBERT GOTTSCHALK
Attesting Officer                      Commissioner of Patents